(12) United States Patent
Marone et al.

(10) Patent No.: US 8,810,786 B2
(45) Date of Patent: Aug. 19, 2014

(54) DEVICE FOR DETECTING THE LEVEL OF A LIQUID IN A CONTAINER

(75) Inventors: Giuseppe Marone, Nichelino (IT); Marco Musso, Cuorgne' (IT)

(73) Assignee: Elbi International S.p.A., Turin (IT)

( * ) Notice: Subject to any disclaimer, the term of this patent is extended or adjusted under 35 U.S.C. 154(b) by 247 days.

(21) Appl. No.: 13/259,641

(22) PCT Filed: Mar. 24, 2010

(86) PCT No.: PCT/IB2010/051272
§ 371 (c)(1),
(2), (4) Date: Sep. 23, 2011

(87) PCT Pub. No.: WO2010/109414
PCT Pub. Date: Sep. 30, 2010

(65) Prior Publication Data
US 2012/0026514 A1  Feb. 2, 2012

(30) Foreign Application Priority Data
Mar. 26, 2009  (IT) .............................. TO2009U0040

(51) Int. Cl.
*G01N 1/10* (2006.01)
*G01B 11/14* (2006.01)

(52) U.S. Cl.
USPC .......................................... 356/246; 356/632

(58) Field of Classification Search
None
See application file for complete search history.

(56) References Cited

U.S. PATENT DOCUMENTS 4,788,444 A * 11/1988 Williams ...................... 250/577
7,040,728 B2 * 5/2006 Merz et al. ......................... 347/7

FOREIGN PATENT DOCUMENTS

DE    298 05 548 U1   6/1998
DE    100 28 630 A1  12/2000

* cited by examiner

*Primary Examiner* — Gregory J Toatley
*Assistant Examiner* — Amanda Merlino
(74) *Attorney, Agent, or Firm* — Sughrue Mion, PLLC

(57) ABSTRACT

A device for detecting the level of a liquid in a container, includes an optical structure facing at least partly the region inside the container in a position corresponding to a predefined level of the liquid and having a main surface, a first side surface and a second side surface which are inclined at about 45° with respect to the main surface and about 90° relative to each other; and an emitter and a receiver facing the main surface of the optical structure and able to send a radiation beam towards the first side surface and, respectively, receive a radiation beam emitted by the emitter and reflected by the first and second side surfaces, when the level of the liquid inside the container is lower than the predefined level. The structure extends mainly outside the container and faces the region inside the container only opposite the first side surface.

7 Claims, 4 Drawing Sheets

DEVICE FOR DETECTING THE LEVEL OF A LIQUID IN A CONTAINER

CROSS REFERENCE TO RELATED APPLICATIONS

This application is a National Stage of International Application No. PCT/IB2010/051272, filed on Mar. 24, 2010, which claims priority from Italian Patent Application No. TO2009U000040, filed Mar. 26, 2009, the contents of all of which are incorporated herein by reference in their entirety.

The present invention relates to a device for detecting the level of a liquid in a container.

More specifically the invention relates to a detection device of the type comprising:
- an optical structure facing at least partly the region inside the container in a position corresponding to a predefined level of the liquid and having a main surface, a first side surface and a second side surface, said side surfaces being inclined at about 45° with respect to the main surface and about 90° relative to each other;
- an emitter and a receiver facing the main surface of the optical structure and able to send a radiation beam towards the first side surface and, respectively, receive a radiation beam emitted by the emitter and reflected by said first and second side surfaces when the level of the liquid inside the container is lower than said predefined level.

Some examples of this type of detection device are disclosed in the German document DE 100 28 630 in the name of the same Applicant and DE 298 05 548. In the devices illustrated in these documents the optical structure extends practically entirely inside the container and faces the inner region of the container opposite both the inclined surfaces.

One object of the invention is to provide an innovative detection device of the type described above.

This object, together with others, is achieved according to the invention by a detection device of the abovementioned type, characterized in that the optical structure extends mainly outside the container and faces the region inside said container only opposite its abovementioned first side surface.

Further characteristic features and advantages of the invention will become clear from the following detailed description provided purely by way of a non-limiting example, with reference to the accompanying drawings in which.

Figure 1:
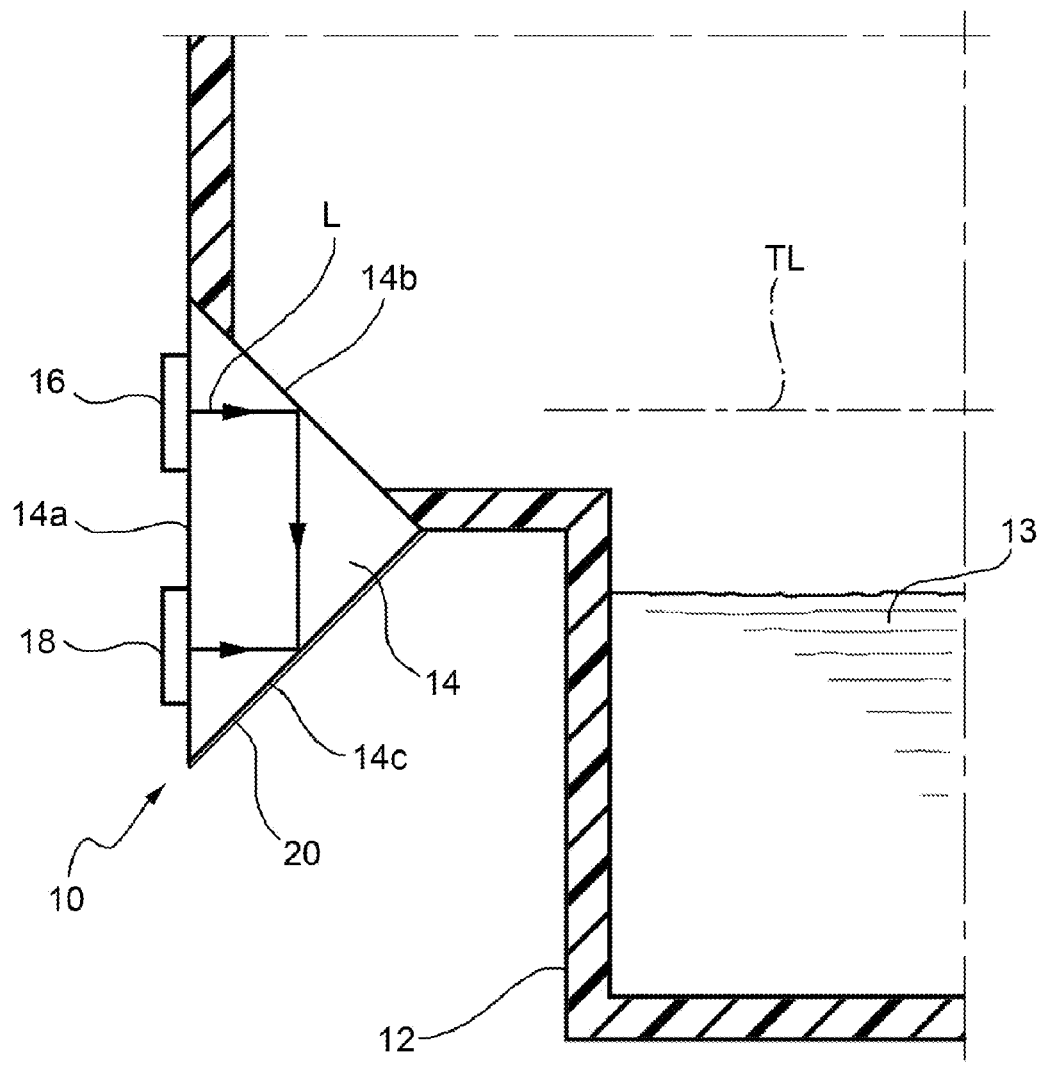
FIG. 1 is a partial cross-sectional view of a first example of embodiment of a device according to the present invention in which the level of the liquid to be detected lies below a predetermined threshold level.
Figure 2:
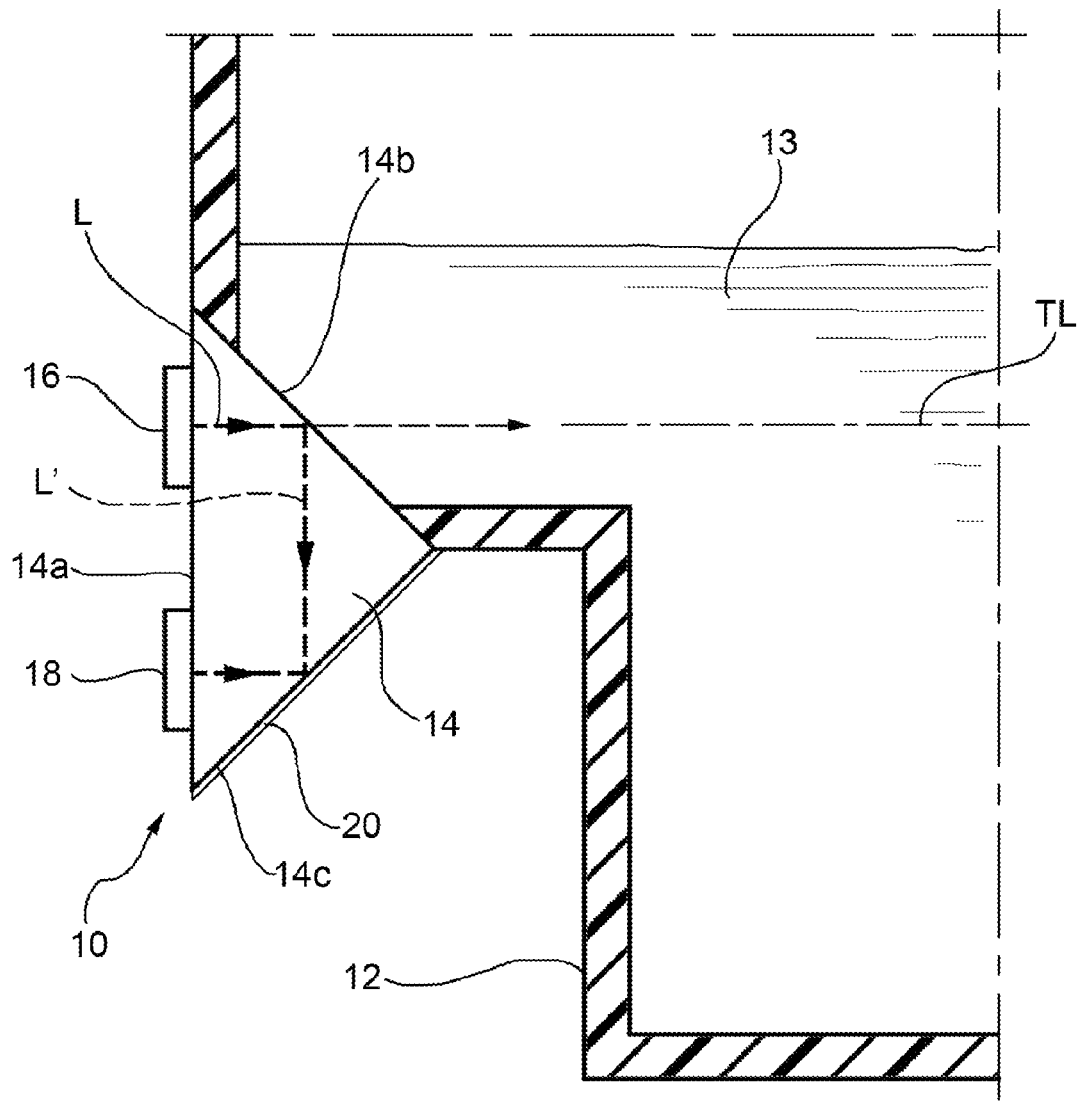
FIG. 2 is a view, similar to that of FIG. 1, but in which the level of the liquid lies above the predetermined threshold level.

With reference to FIGS. 1 and 2, 10 denotes overall a first embodiment of the device according to the present invention.

In the first embodiment shown, the device 10 is associated with a container 12 which receives inside it a substance 13 in the liquid state. For example, the container 12 may be a reservoir for a washing and/or rinsing agent for a dish-washing machine (details not shown). In any case, the device 10 is designed to be associated also with other types of containers.

The device 10 comprises an optical structure 14, an emitter 16 and a receiver 18.

The optical structure 14 faces at least partly the region inside the container 12 along a portion corresponding to a predefined level of the liquid and has a main surface 14a, a first side surface 14b and a second side surface 14c.

The first main surface 14b and the second side surface 14c are inclined at about 45° with respect to the main surface 14a.

Moreover, the first side surface 14b and the second side surface 14c are inclined at 90° relative to each other.

The optical structure 14 extends mainly outside the container 12 and faces the region inside this container only opposite its abovementioned first side surface 14b.

In the first embodiment of the device 10, the optical structure 14 is advantageously a prism which has a cross-section substantially in the form of an isosceles triangle in which the larger side or hypotenuse is defined by the main surface 14a and the two smaller sides or catheti are defined by the first side surface 14a and the second side surface 14b.

The emitter 16 (for example, an LED) and the receiver 18 (for example, a photodiode or a phototransistor) face the main surface 14a of the optical structure 14. The emitter 16 is able to send a (visible or infrared) radiation beam L towards the first side surface 14b. Subsequently the radiation beam L may in certain cases be reflected by the first side surface 14b towards the second side surface 14c and then be further reflected by the second side surface 14c. The latter is in turn able to direct this beam towards the receiver 18.

In an advantageous manner, the optical structure 14 may be assembled together with the container 10 by means of over-moulding.

The operating principle of the device 10 in accordance with the first embodiment of the present invention will now be described.

In FIG. 1 the container 12 is shown in a condition where the liquid 13 contained therein lies below a predetermined threshold level TL. In this condition, the radiation beam L emitted by the emitter 16 is not substantially refracted, but is (mainly) reflected by the first side surface 14b and by the second side surface 14c towards the receiver 18. Consequently the receiver 18 receives a radiation beam with a radiating intensity sufficient for this receiver 18 to be activated and supply a signal indicating the fact that the liquid is below the predetermined threshold level. The abovementioned signal may also be forwarded to an external control unit (not shown).

In FIG. 2 the container 12 is shown in a condition where the liquid contained therein lies above the predetermined threshold level TL. In this condition the liquid 13 covers the first side surface 14b. Therefore the radiation beam L emitted by the emitter 16 is mainly refracted by the first side surface 14b and is dispersed through the liquid 13. Only a fraction L' of the radiation beam L is reflected by the first side surface 14b towards the second side surface 14c and then towards the receiver 18. The fraction L' of the radiation beam L which reaches the receiver 18 has a radiating intensity insufficient for activating the latter.

As can be seen in the embodiment shown in the FIGS. 1 and 2, the second side surface 14c is preferably provided with an optically reflective coating 20. In this way any component of the fraction L' of the radiation beam L which is refracted by the second side surface 14c is reduced.

Figure 3:
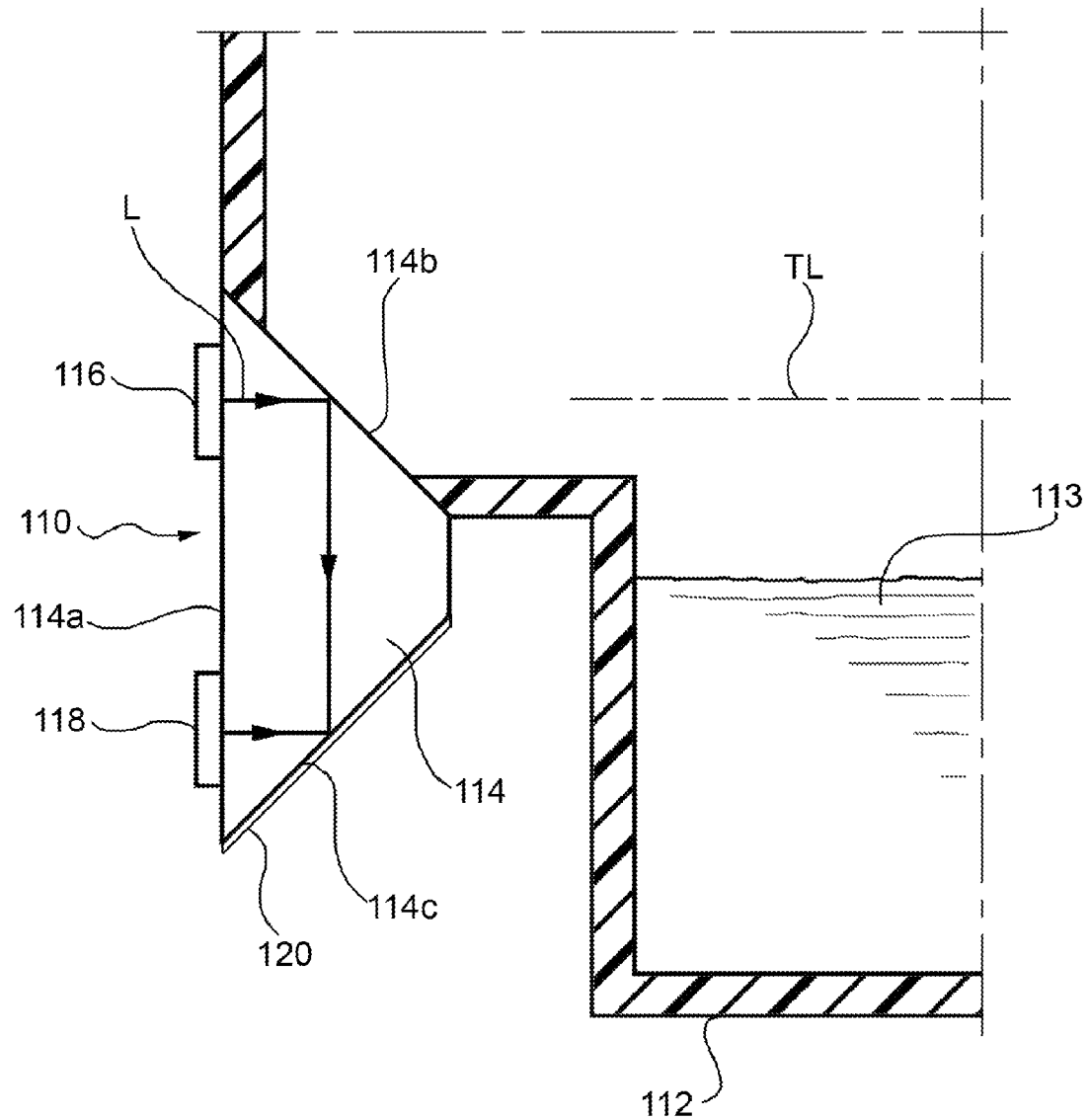
FIG. 3 is a partial cross-sectional view of a second example of embodiment of a device according to the present invention in which the level of the liquid to be detected lies below a predetermined threshold level.
Figure 4:
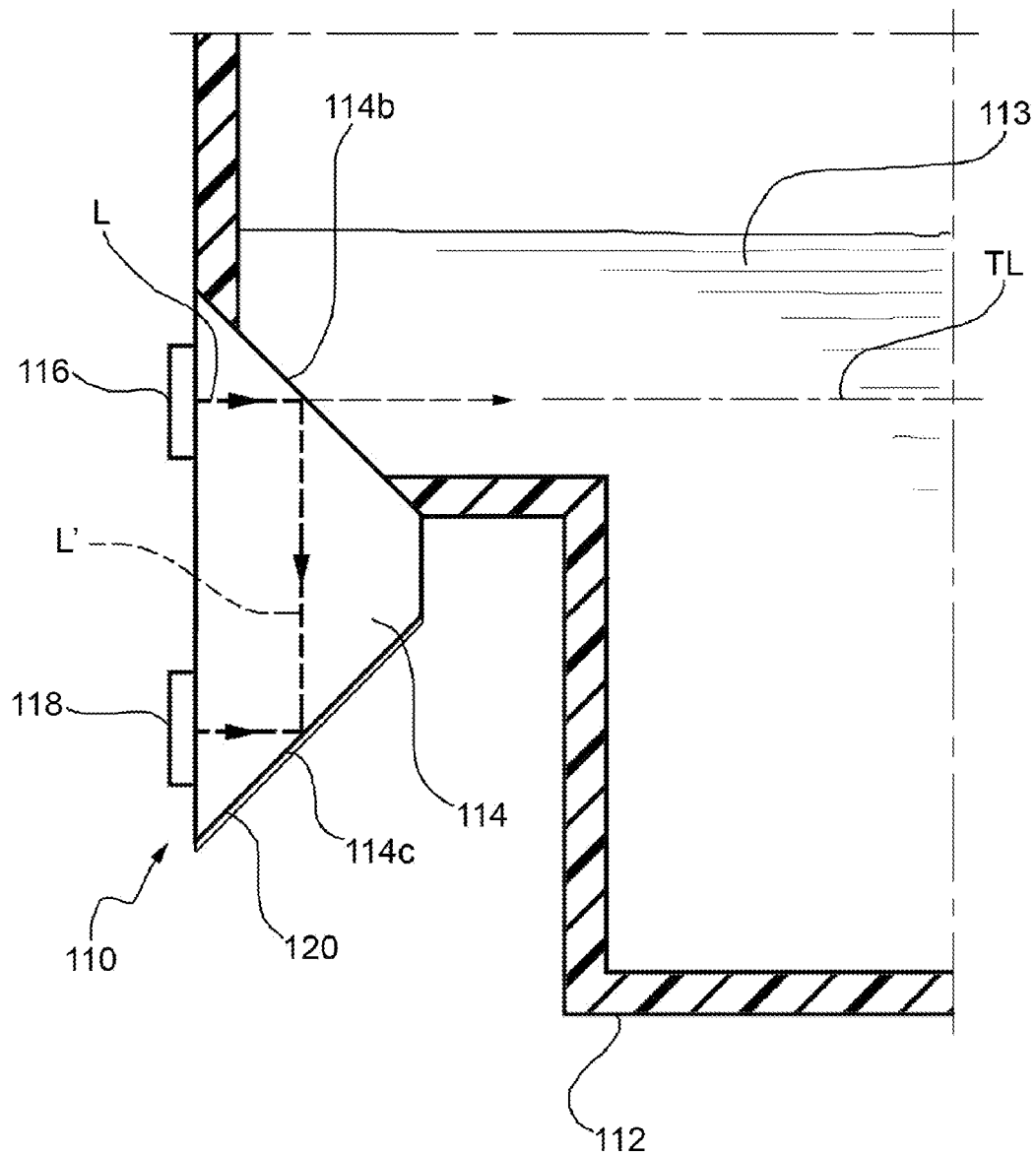
FIG. 4 is a view, similar to that of FIG. 3, but in which the level of the liquid lies above the predetermined threshold level.

With reference to FIGS. 3 and 4, 110 denotes overall a second embodiment of the device according to the present invention.

Details and parts which are similar to—or have the same function as—those in the first embodiment described above are indicated by the same reference numbers and/or letters preceded by 1.

The device 110 in accordance with the second embodiment differs mainly in that the optical structure 114 of the device 110 is advantageously a prism which has a cross-section substantially in the form of an isosceles trapezium in which the larger base is defined by the main surface 114a and the oblique sides define the first side surface 114b and the second side surface 114c.

In this second embodiment, the operating principle of the device 110 is the same as that of the device 10 according to the first embodiment and, for the sake of brevity, will not be described below.

Obviously, without affecting the principle of the invention, the embodiments and the constructional details may be significantly modified with respect to that described and illustrated purely by way of a non-limiting example, the invention embracing all those variations of embodiment which achieve the same use owing to the same innovative ideas.

The invention claimed is:

1. A device for detecting the level of a liquid in a container, comprising:
   an optical structure facing at least partly the region inside the container in a position corresponding to a predefined level (TL) of the liquid and having a main surface, a first side surface and a second side surface, said side surfaces being inclined to about 45° with respect to the main surface and about 90° relative to each other; and
   an emitter and a receiver facing the main surface of the optical structure and able to send a radiation beam (L) towards the first side surface and, respectively, receive a radiation beam (L) emitted by the emitter and reflected by said first and second side surfaces, when the level of the liquid inside the container is lower than said predefined level (TL);
   wherein
   the optical structure extends mainly outside the container and faces the region inside said container only opposite the first side surface.

2. The device according to claim 1, wherein the optical structure comprises a prism which has a cross-section substantially in the form of an isosceles triangle.

3. The device according to claim 1, wherein the optical structure comprises a prism which has a cross-section substantially in the form of an isosceles trapezium.

4. The device according to claim 1, wherein said second side surface is provided with an optically reflective coating.

5. A container comprising a device according to claim 1.

6. The container according to claim 5, wherein the optical structure is assembled by means of overmoulding onto the container.

7. The device according to claim 1, wherein said first side surface of the optical structure is arranged at least partially facing an opening in a side wall of said container.

* * * * *